June 10, 1958  J. B. BURTON  2,838,149
COMBINATION BRAKE AND CLUTCH MECHANISM
Filed Aug. 3, 1953  4 Sheets-Sheet 1

INVENTOR
Jesse B. Burton
BY
Rockwell-Bartholow
ATTORNEYS

June 10, 1958  J. B. BURTON  2,838,149
COMBINATION BRAKE AND CLUTCH MECHANISM
Filed Aug. 3, 1953  4 Sheets-Sheet 2

INVENTOR
Jesse B. Burton
BY
Rockwell Bachelder
ATTORNEYS

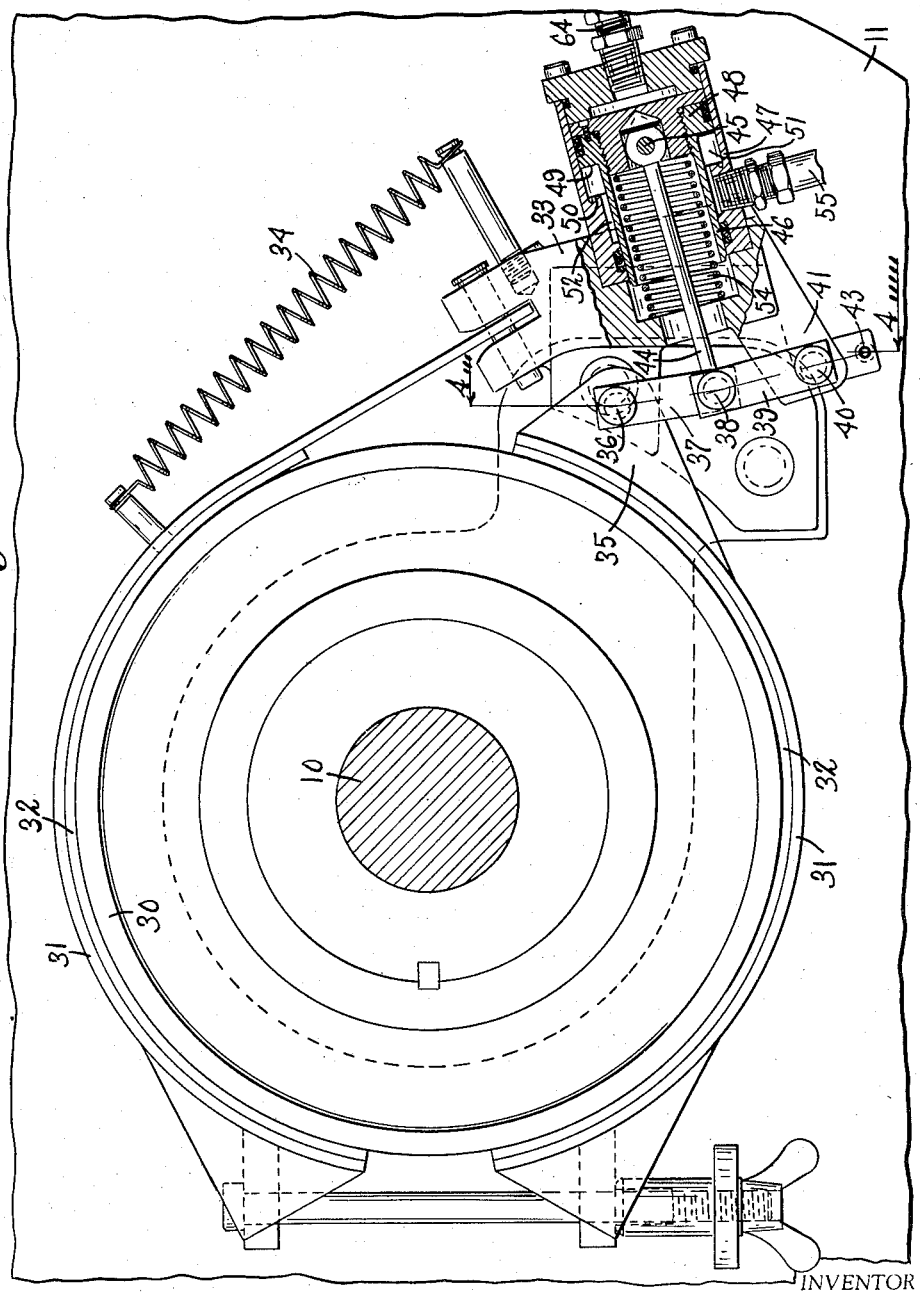

June 10, 1958     J. B. BURTON     2,838,149
COMBINATION BRAKE AND CLUTCH MECHANISM
Filed Aug. 3, 1953     4 Sheets-Sheet 4
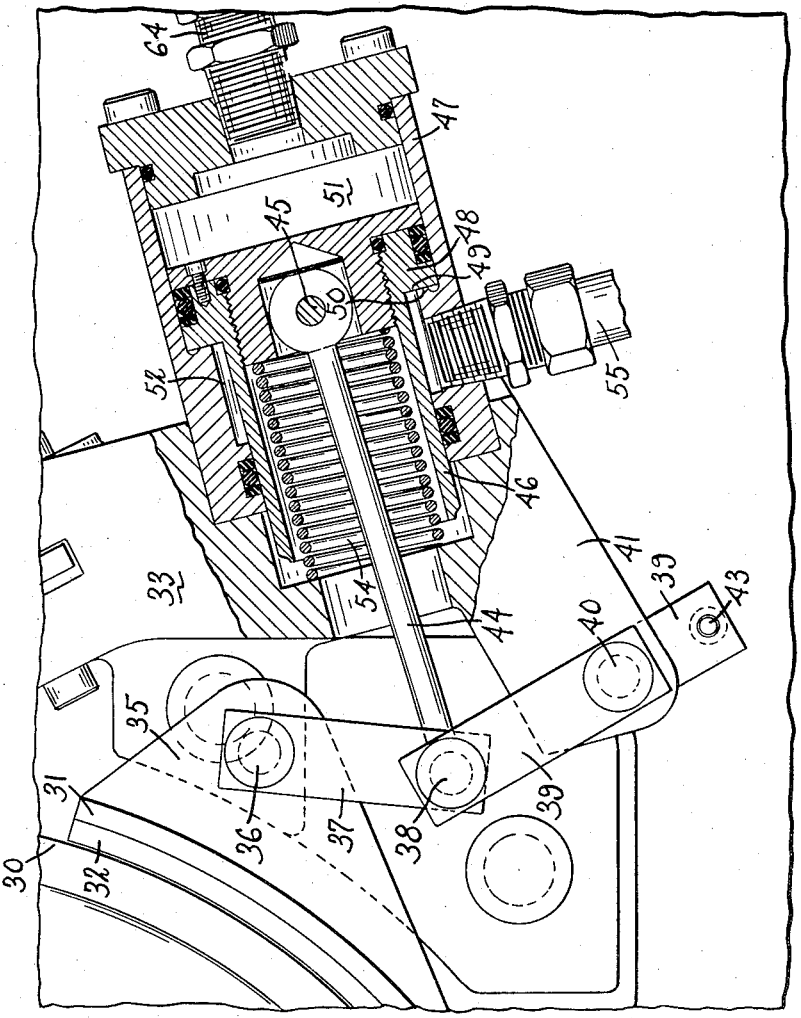
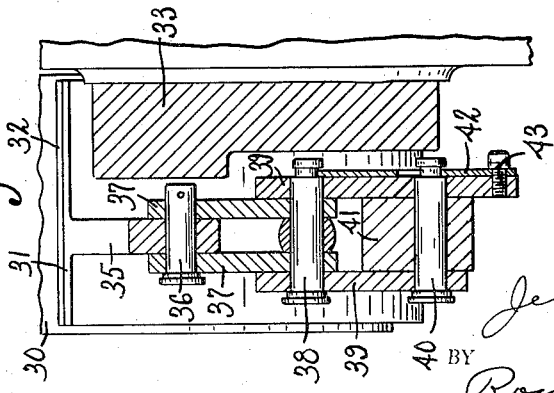
INVENTOR
Jesse B. Burton
BY
ATTORNEYS

United States Patent Office 2,838,149
Patented June 10, 1958

2,838,149

COMBINATION BRAKE AND CLUTCH MECHANISM

Jesse B. Burton, Waterbury, Conn., assignor to The Waterbury Farrel Foundry & Machine Company, Waterbury, Conn., a corporation of Connecticut Application August 3, 1953, Serial No. 372,024

14 Claims. (Cl. 192—12)

This invention relates to a combined clutch and brake mechanism and, although capable of general application, is designed for use particularly in a clutch and brake mechanism for presses or like machines.

In the operation of a press, for example, or where it is desired to drive one member such as a shaft from a driving member, such as a pulley, for example, it is desired to provide a clutch and brake mechanism such that when the clutch is applied to drive the shaft, the brake will be instantly released and, conversely, when the clutch is released to stop rotation of the shaft, the brake will be instantly applied to bring about an immediate cessation of the operation. It is desirable that these actions take place in accurately timed relation so that the clutch will not be applied when the brake is still partially set or dragging and likewise so that the brake will not be applied when power is still being transmitted from the drive pulley, for example, to the shaft through the clutch.

As illustrated, the clutch and brake are operated by a fluid pressure medium such as compressed air, for example, a piston and cylinder being provided to bring about the application of the brake, and other pneumatic means being employed to operate the clutch. The arrangement of the parts is such that when air under pressure is introduced to the clutch to engage the same, it will likewise be applied to the cylinder of the brake mechanism to release the latter.

The brake-actuating mechanism comprises a cylinder having a differential piston, and the releasing fluid pressure is applied to the larger surface of this piston whenever actuating pressure is applied to the clutch mechanism. The smaller area of the differential piston is, during the operation of the structure, constantly subjected to fluid pressure which tends to actuate the piston in a direction to apply the brake so that when the larger area of the piston is no longer subjected to fluid pressure, the brake will be applied by the steady or constant pressure to which the smaller area of the piston is subjected. Also a spring is provided in the cylinder which acts on the piston in a manner to urge it in a direction to apply the brake so that, even if no fluid pressure is present in the system, the brake will be held in applied position by the spring. During operation of the device, however, the pressure on the smaller area of the piston and the force of the spring tend to apply the brake.

As has been stated, fluid pressure is applied to the clutch-actuating mechanism to engage the same and is released or exhausted from this mechanism to release the clutch. It may sometimes occur that the air will be exhausted from the larger area of the differential piston so rapidly that the brake might be set prior to the complete disengagement of the clutch, thus causing the clutch and brake to oppose each other. To prevent such an occurrence, I have provided an exhaust-retarding means for the cylinder of the brake-applying mechanism to retard the exhaust of air therefrom so that the brake will not be applied until the clutch is disengaged.

One object of the present invention is to provide a new and improved combined clutch and brake mechanism.

A further object of the invention is to provide an improved brake mechanism which may be operated by fluid pressure and which will act in a positive and efficient manner.

A still further object of the invention is the provision of a brake-actuating mechanism of the character described which may be accurately timed with relation to a cltuch-engaging mechanism so that the brake will not be applied until the clutch is disengaged.

A still further object of the invention is to provide a brake-actuating mechanism comprising a cylinder having a differential piston therein so that the smaller area of the piston may be subjected to constant fluid pressure urging the piston in a direction to apply the brake, and the larger area of the piston may be subjected intermittently to fluid pressure when it is desired to overcome the action of the constantly applied fluid pressure and effect the application of the clutch.

To these and other ends the invention consists in the novel features and combinations of parts to be hereinafter described and claimed.

In the accompanying drawings:

Fig. 3 is a transverse sectional view on line 3—3 of Fig. 2 showing the brake in applied position;

Fig. 4 is a sectional view on line 4—4 of Fig. 3;

Fig. 5 is an enlarged sectional view through the brake-actuating mechanism showing the brake in released position; and Fig. 6 is a sectional view through the retarding exhaust valve for the brake-releasing mechanism.

Figure 1:
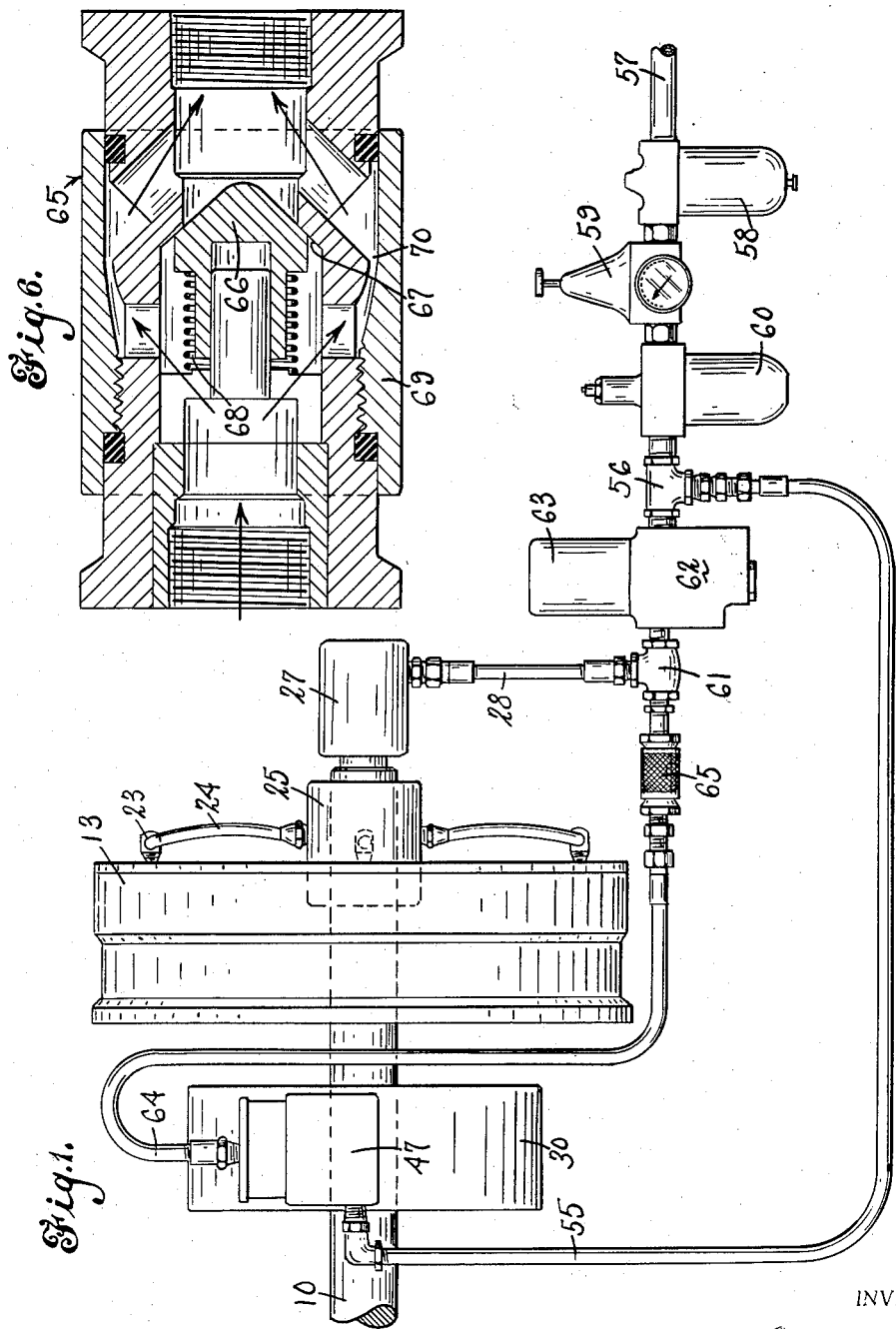
Fig. 1 is a diagrammatic view of my improved clutch and brake mechanism and the controlling means therefor.

To illustrate a preferred embodiment of my invention, I have shown in the drawings a shaft 10 adapted to be driven from a drive pulley 11, the pulley being rotatably mounted on the shaft upon bearings 12. Secured to the pulley is a clutch housing 13 carrying spaced clutch plates 14 and 14ᵃ keyed to the housing at 15 so that these plates rotate with the housing but at least one thereof, the plate 14, is movable therein axially of the shaft.

Between the clutch plates 14 and 14ᵃ is a clutch plate 16 which is keyed at 17 to an adaptor 18 rigid with the shaft 10 so that when the clutch plates 14 and 14ᵃ are engaged with the plate 16, the shaft will be rotated from the pulley.

Figure 2:
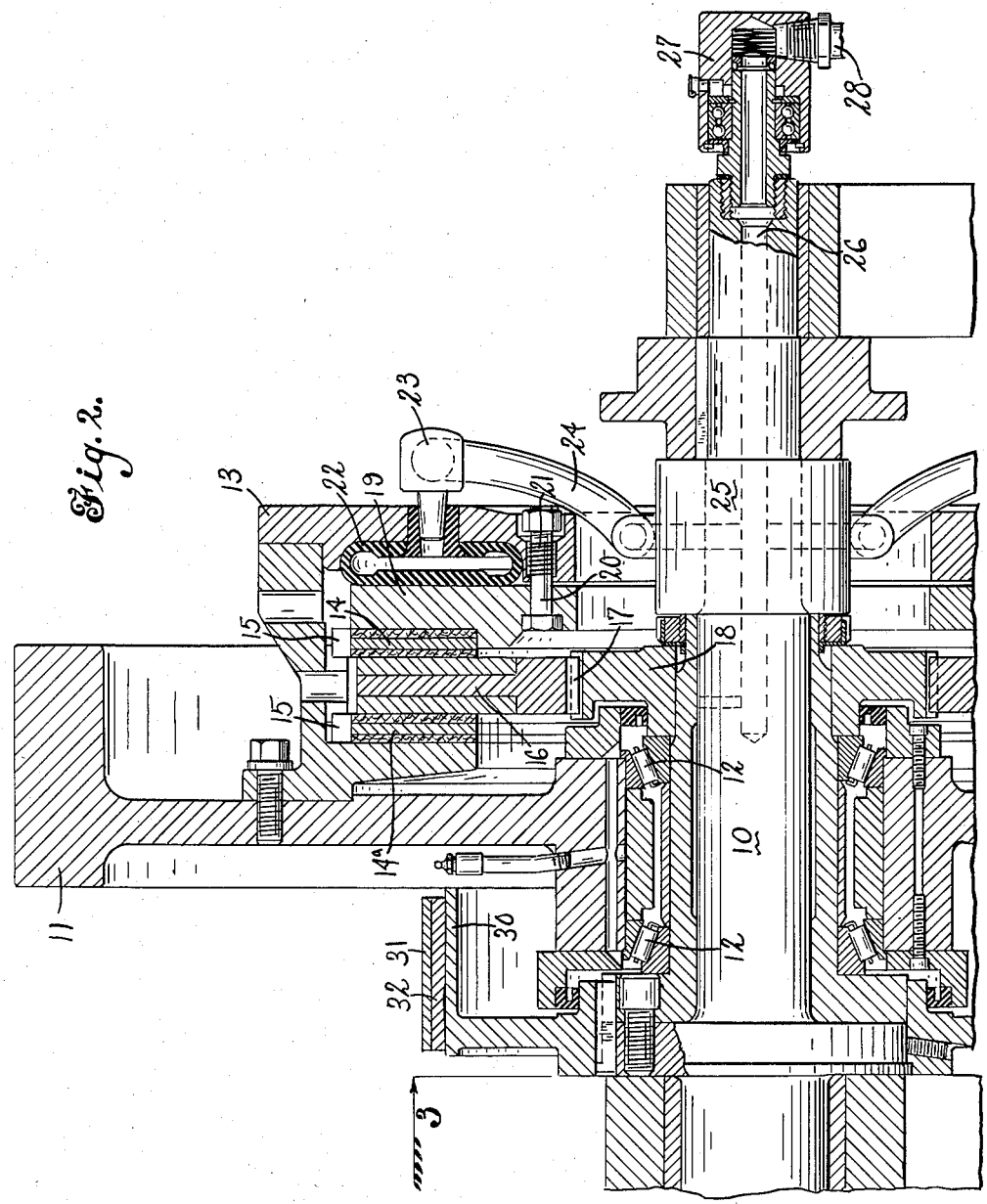
Fig. 2 is a sectional view through the clutch and brake.

As previously stated, the clutch plate 14 is movable with respect to the clutch housing, and this plate is carried by a ring 19 movably mounted upon the wall of the housing 13 by bolts 20, the plate being urged to the right or toward the housing by springs 21 surrounding the bolts. This ring together with the clutch plate is moved inwardly or toward the left, as shown in Fig. 2, by the expansible pneumatic bellows 22 which, when inflated, cause the clutch plate 16 of the shaft 10 to be engaged by the plates 14 and 14ᵃ which rotate with the pulley and thus engage the pulley in driving relation with the shaft.

A fluid under pressure such as compressed air, for example, is introduced into the bellows 22 through a quick-release valve 23 and conduits 24, these conduits leading to a seal 25 on shaft 10, the purpose of which is to pass air or the like between relatively movable parts. This seal 25 connects the conduits 24 with a bore 26 in the shaft, which bore communicates with a sealing member 27 from which leads the conduit 28 to a controlling valve to be hereinafter described.

From the above it will be apparent that when a pressure fluid is introduced into the inflatable bellows 22 through the conduit 28 and the bore 26 of shaft 10, the clutch mechanism will be engaged so as to drive the shaft from the pulley 11. It will, of course, be understood that when the clutch is not engaged the pulley rotates idly upon the shaft by virtue of the bearings 12.

The brake mechanism shown more especially in Figs. 3 and 5 comprises a brake drum 30 mounted on the shaft 10 with which cooperates the brake band comprising the sections 31 which are provided with the usual lining 32 to grip the drum 30 when the brake is applied. One of the brake band sections 31 is connected to a bracket 33 mounted on a fixed part of the structure and a spring 34 connects the bracket with this brake band section in order to relieve the shaft of the weight or drag of the brake band when the brake is released.

The adjacent end of the other brake band section 31 is provided with a lug 35 to which are pivoted at 36 companion links 37. To these links are pivoted at 38 companion links 39, the links 37 and 39 forming a toggle mechanism to actuate the brake band to apply and release the brake. The free ends of the links 39 are pivoted at 40 to an ear 41 projecting from the bracket 33 previously referred to. The pivot pins 38 and 40 may be locked in place by the lock link 42 secured by the screw 43 to one of the links 39.

Pivoted on the pivot pin 38 of the toggle mechanism is a piston rod 44, the other end of which is pivoted at 45 to a differential piston 46, this piston being mounted in a cylinder 47. The piston 46 is provided with an enlarged head 48 providing a step or shoulder 49 between the head and the body of the piston. The cylinder 47 is provided with a complemental shoulder or step 50, thus providing in the cylinder two portions of unequal diameter, the larger portion of the cylinder accommodating the head 48 of the piston. It will, of course, be appreciated that pressure fluid in this enlarged portion 51 of the cylinder will act on the face of the head 48 of the piston while fluid pressure in the smaller portion 52 of the cylinder will act upon the shoulder or face 49 of the piston. As the area of this shoulder is considerably less than that of the outer face of the head 48 of the piston, the pressure in the portion 51 of the cylinder will predominate and urge the piston toward the left provided the fluid pressure is the same in each portion of the cylinder.

A compression spring 54 is mounted within the piston and urges the piston toward the right, as shown in Fig. 5, or in a direction to straighten the toggle links 37 and 39, which is the direction the piston is moved to apply the brake. Hence this spring will tend to urge the brake to applied position as well as pressure fluid introduced into the portion 52 of the cylinder. However, the effect of fluid pressure of equal pressure in the enlarged portion 51 of the cylinder will be sufficient to overcome the effect of pressure in the cylinder portion 52 plus the effect of the spring 54 so that when pressure exists in the enlarged portion 51 of the cylinder, the piston will be driven toward the left to the position shown in Fig. 5 to release the brake mechanism.

It is contemplated that the smaller portion 52 of the cylinder will be under constant or steady pressure introduced therein through the line 55 (Figs. 1 and 5) which line leads to a fitting 56 in the line 57 which will be connected with a supply or source of air under pressure (not shown). Between the source of air supply and the fitting 56, an air cleaner 58, a pressure-regulating valve 59, and an air lubricator 60, shown diagrammatically in Fig. 1, may be mounted in the line 57.

It has already been stated that fluid pressure is introduced into the bellows 22 of the clutch mechanism through the pipe 28. As shown in Fig. 1, this pipe is connected to a fitting 61 which is installed in the line 57. Between this fitting and the fitting 56 is mounted a three-way valve structure 62 which will preferably be electrically actuated such as by the solenoid 63, which valve controls the admission of pressure into the line or conduit 28 and likewise controls the introduction of pressure to the line 64 which leads to the enlarged portion 51 of the cylinder 47 to effect release of the brake, that is, the fitting 61 is merely a T fitting connecting the air line 57 with both of the lines 28 and 64, and the admission of air into, and the exhaust of air from, the lines 28 and 64 is controlled by the solenoid-actuated valve 62 so that air will be admitted into these two lines simultaneously and also exhausted therefrom simultaneously.

As stated above, it sometimes occurs that when the valve 62 is open to exhaust the enlarged portion 51 of the cylinder 47, it will exhaust too rapidly and result in the application of the brake before the complete disengagement of the clutch. To prevent such an occurrence a retarding valve 65 is placed in the line 64. This valve may be of the usual forms such, for example, as that shown in Fig. 6. As illustrated, it comprises a spring-pressed valve member 66 urged against its seat 67 by a spring 68. The casing 69 of the valve is provided with a bypass passage 70 about this valve. It will be apparent that when pressure fluid is introduced into the right-hand side of the valve structure the valve 66 will be unseated against the pressure of the spring 68 and permit the air to flow freely through the opening in the valve seat 67. However, when pressure exists on the left-hand side of the valve 66 and is exhausted upon the right-hand side, the spring 68 will move the valve 66 to closed position and compel the exhaust to take place through the bypass passage 70. This will retard the exhaust of the air through the valve from the enlarged portion 51 of the brake cylinder and will retard the application of the brake.

The operation of the device may be briefly described as follows. It will be understood that the drive pulley 11 will be driven from any desired source and during the operation of the device will be in continuous rotation. The line 57 will be connected with a source of air under pressure, and this pressure will obtain in the line 55 and in the smaller portion 52 of the cylinder 47. At this time no pressure will exist in the portion 51 of the cylinder so that the air pressure in the portion 52 together with the spring 54 will force the piston to the right, as shown in Fig. 3, thus straightening the toggle links 37 and 38 and holding the brake in applied position.

If it is desired to set the shaft 10 into operation, the solenoid valve 62 is operated to introduce pressure fluid simultaneously into the lines 28 and 64. This will cause the bellows 22 to be inflated and engage the clutch plates 14, 14ᵃ and 16 so as to drive the shaft 10. Simultaneously the fluid pressure in the line 64 will enter the enlarged portion 51 of the brake cylinder, thus moving the piston toward the left and breaking the toggle mechanism constituted by the links 37 and 39, as shown in Fig. 5, to release the brake and permit free rotation of the shaft 10.

To stop the press or to stop rotation of the shaft 10, the valve 62 is operated to exhaust air from the lines 28 and 64. When this occurs the quick-release valves 23 will immediately exhaust the air from the inflated bellows 22 to disengage the clutch. Also, air from the larger portion 51 of the cylinder 47 will exhaust through the retarding valve mechanism 65 (shown in Fig. 6) so that the piston 46 will be driven to the right by the constant pressure supplied to the cylinder through the line 55 and also by the action of the spring 54 to apply the brake and stop the shaft.

The spring 54 will serve to hold the brake in applied position if the air pressure is shut off from the line 57 so that whether or not the system is connected to a source of air supply, the brake mechanism will normally be held in applied position.

While I have shown and described a preferred embodiment of my invention, it will be understood that it

What I claim is:

1. In a combination brake and clutch mechanism, a driving member, a shaft to be driven thereby, fluid-pressure-operated clutch means to drivingly connect said member to the shaft, braking means to effect a braking action on said shaft, fluid-pressure-operated mechanism to actuate said braking means comprising a piston and a cylinder, means constantly supplying a compressible fluid under pressure to one portion of said cylinder to normally urge said brake means to brake-applying position, and means for supplying fluid pressure, at will, to another portion of said cylinder to release the brake and simultaneously supply fluid pressure to said clutch means to engage the same.

2. In a combination brake and clutch mechanism, a driving member, a shaft to be driven thereby, fluid-pressure-operated clutch means to drivingly connect said member to the shaft, braking means to effect a braking action on said shaft, fluid-pressure-operated mechanism to actuate said braking means comprising a piston and a cylinder, means constantly supplying a compressible fluid under pressure to one portion of said cylinder to normally urge said brake means to brake-applying position, and valve-controlled means for supplying fluid pressure, at will, to another portion of said cylinder to release the brake and simultaneously supplying fluid pressure to said clutch means to engage the same.

3. In a combination brake and clutch mechanism, a driving member, a shaft to be driven thereby, fluid-pressure-operated clutch means to drivingly connect said member to the shaft, braking means to effect a braking action on said shaft, fluid-pressure-operated mechanism to actuate said braking means, means constantly supplying a compressible fluid under pressure to said mechanism to urge the brake to applied position, and additional means for supplying fluid pressure, at will, to said mechanism to overcome said constant supply thereto and release the brake, and means for supplying clutch-engaging pressure to said clutch means simultaneously with the supply to said fluid-pressure-operated mechanism by said additional means.

4. In a combination brake and clutch mechanism, a driving member, a shaft to be driven thereby, fluid-pressure-operated clutch means to drivingly connect said member to the shaft, braking means to effect a braking action on said shaft, fluid-pressure-operated mechanism to actuate said braking means comprising a cylinder and a differential piston therein, means for constantly supplying a compressible fluid under pressure to one part of said piston to urge said brake means to applied position, and means to supply fluid pressure to another part of said piston to overcome the action of said constant fluid pressure supply and release the brake.

5. In a combination brake and clutch mechanism, a driving member, a shaft to be driven thereby, fluid-pressure-operated clutch means to drivingly connect said member to the shaft, braking means to effect a braking action on said shaft, fluid-pressure-operated mechanism to actuate said braking means comprising a cylinder and a differential piston therein, means for constantly supplying a compressible fluid under pressure to one part of said piston to urge said brake means to applied position, and means to supply fluid pressure to another part of said piston to overcome the action of said constant fluid pressure supply and release the brake and to simultaneously supply fluid pressure to said clutch means to engage the same.

6. In a combination brake and clutch mechanism, a driving member, a shaft to be driven thereby, fluid-pressure-operated clutch means to drivingly connect said member to the shaft, braking means to effect a braking action on said shaft, fluid-pressure-operated mechanism to actuate said braking means comprising a cylinder and a differential piston therein, means for simultaneously supplying fluid pressure to one side of said piston and to said clutch means to engage the latter and release the brake, and means constantly supplying a compressible fluid under pressure to the other side of said piston tending to engage the brake.

7. In a combination brake and clutch mechanism, a driving member, a shaft to be driven thereby, fluid-pressure-operated clutch means to drivingly connect said member to the shaft, braking means to effect a braking action on said shaft, fluid-pressure-operated mechanism to actuate said braking means comprising a cylinder and a differential piston therein, means for simultaneously supplying fluid pressure to one side of said piston and to said clutch means to engage the latter and release the brake, means constantly supplying a compressible fluid under pressure to the other side of said piston tending to engage the brake, and means to simultaneously exhaust fluid pressure from said clutch means and the first side of said piston.

8. In a combination brake and clutch mechanism, a driving member, a shaft to be driven thereby, fluid-pressure-operated clutch means to drivingly connect said member to the shaft, braking means to effect a braking action on said shaft, fluid-pressure-operated mechanism to actuate said braking means comprising a cylinder and a differential piston therein, means for simultaneously supplying fluid pressure to one side of said piston and to said clutch means to engage the latter and release the brake, means constantly supplying a compressible fluid under pressure to the other side of said piston tending to engage the brake, means to simultaneously exhaust fluid pressure from said clutch means and the first side of said piston, and means to retard the exhaust of fluid pressure from the first side of said piston.

9. In a combination brake and clutch mechanism, a driving member, a shaft to be driven thereby, fluid-pressure-operated clutch means to drivingly connect said member to the shaft, braking means to effect a braking action on said shaft, fluid-pressure-operated mechanism to actuate said braking means comprising a cylinder and a differential piston therein, the less effective area of said piston being constantly subject to the fluid pressure of a compressible fluid tending to apply the brake, and means to supply fluid pressure, at will, to the other area of said piston to apply the brake and simultaneously supply fluid pressure to said clutch to engage the same.

10. In a combination brake and clutch mechanism, a driving member, a shaft to be driven thereby, fluid-pressure-operated clutch means to drivingly connect said member to the shaft, braking means to effect a braking action on said shaft, fluid-pressure-operated mechanism to actuate said braking means comprising a piston and a cylinder, means to supply fluid pressure simultaneously to said clutch means to engage the same and to said cylinder to release the brake, means to simultaneously exhaust fluid pressure from said clutch means and cylinder, and additional fluid-pressure-operated means to urge said brake to applied position upon exhaust of the cylinder.

11. In a combination brake and clutch mechanism, a driving member, a shaft to be driven thereby, fluid-pressure-operated clutch means to drivingly connect said member to the shaft, braking means to effect a braking action on said shaft, fluid-pressure-operated mechanism to actuate said braking means comprising a piston and a cylinder, means to supply fluid pressure simultaneously to said clutch means to engage the same and to said cylinder to release the brake, means to simultaneously exhaust fluid pressure from said clutch means and cylinder, and combined spring and fluid-pressure-actuated means to urge said brake to applied position.

12. In a combination brake and clutch mechanism, a driving member, a shaft to be driven thereby, fluidpressure-operated clutch means to drivingly connect said member to the shaft, braking means to effect a braking action on said shaft, fluid-pressure-operated mechanism to actuate said braking means comprising a cylinder and a differential piston therein, means for constantly supplying a compressible fluid under pressure to one part of said piston to urge said brake means to applied position, means to supply fluid pressure to another part of said piston to overcome the action of said constant fluid pressure supply and release the brake, and spring means acting on said piston in a direction to apply the brake.

13. In a combination brake and clutch mechanism, a driving member, a shaft to be driven thereby, fluid-pressure-operated clutch means to drivingly connect said member to the shaft, braking means to effect a braking action on said shaft, fluid-pressure-operated mechanism to actuate said braking means comprising a cylinder and a differential piston therein, means for constantly supplying a compressible fluid under pressure to one part of said piston to urge said brake means to applied position, means to supply fluid pressure to another part of said piston to overcome the action of said constant fluid pressure supply and release the brake, and a toggle mechanism connecting said piston to said braking means.

14. In a combination brake and clutch mechanism, a driving member, a shaft to be driven thereby, fluid-pressure-operated clutch means to drivingly connect said member to the shaft, braking means to effect a braking action on said shaft, fluid-pressure-operated mechanism to actuate said braking means comprising a cylinder and a differential piston therein, the less effective area of said piston being constantly subject to the fluid pressure of a compressible fluid tending to apply the brake, means to supply fluid pressure, at will, to the other area of said piston to apply the brake and simultaneously supply fluid pressure to said clutch to engage the same, and spring means acting on said piston urging the latter to position to apply the brake.

References Cited in the file of this patent
UNITED STATES PATENTS

| | | |
|---|---|---|
| 1,146,526 | Scanlan | July 13, 1915 |
| 1,298,956 | Johnson | Apr. 1, 1919 |
| 1,864,126 | Ferris | June 21, 1932 |
| 1,869,085 | Williamson | July 26, 1932 |
| 2,703,162 | Keim et al. | Mar. 1, 1955 |
| 2,706,026 | Georgeff | Apr. 12, 1955 |
| 2,722,298 | Munschauer | Nov. 1, 1955 |